(12) United States Patent
D'Inca

(10) Patent No.: US 6,763,171 B2
(45) Date of Patent: Jul. 13, 2004

(54) OPTICAL ASSEMBLY

(75) Inventor: Claudio D'Inca, Genoa (IT)

(73) Assignee: Marconi Communications S.p.A., Genoa (IT)

( * ) Notice: Subject to any disclaimer, the term of this patent is extended or adjusted under 35 U.S.C. 154(b) by 0 days.

(21) Appl. No.: 10/276,529

(22) PCT Filed: Apr. 27, 2001

(86) PCT No.: PCT/IB01/00856

§ 371 (c)(1),
(2), (4) Date: May 8, 2003

(87) PCT Pub. No.: WO01/92927

PCT Pub. Date: Dec. 6, 2001

(65) Prior Publication Data

US 2003/0169993 A1 Sep. 11, 2003

(30) Foreign Application Priority Data

May 31, 2000 (IT) ..................................... TO2000A0505

(51) Int. Cl.[7] ................................................ G02B 6/00
(52) U.S. Cl. .................................................... 385/135
(58) Field of Search .................................. 385/134, 135

(56) References Cited

U.S. PATENT DOCUMENTS

| 5,142,606 | A | * | 8/1992 | Carney et al. | ............... 385/134 |
| 5,335,349 | A | * | 8/1994 | Kutsch et al. | ............... 375/257 |
| 5,363,467 | A | * | 11/1994 | Keith | ........................... 385/135 |
| 5,457,764 | A | * | 10/1995 | Edera | ........................... 385/135 |
| 5,659,641 | A | * | 8/1997 | DeMeritt et al. | .............. 385/14 |
| 5,746,389 | A | * | 5/1998 | Willmann | ................ 242/615.1 |
| 5,894,540 | A | * | 4/1999 | Drewing | ..................... 385/135 |
| 6,263,141 | B1 | * | 7/2001 | Smith | ........................... 385/135 |
| 6,314,230 | B1 | * | 11/2001 | Daoud et al. | ................ 385/135 |

FOREIGN PATENT DOCUMENTS

| DE | 40 34 832 A1 | * | 7/1992 |
| EP | 0 549 963 A2 | * | 7/1993 |
| GB | 2 293 891 A | * | 4/1996 |

* cited by examiner

Primary Examiner—Tulsidas C. Patel
(74) Attorney, Agent, or Firm—Kirschstein, et al.

(57) ABSTRACT

An optical assembly has a number of optical fibers which terminate at connectors which connect to short lengths of optical fibers which connect, in turn, to an optical back plane mounted within a housing. The connectors are withdrawn from the housing for inspection. A plurality of movable guides is provided for the short fibers to determine a number of optical paths which remain of constant length as the connectors are withdrawn from the housing.

8 Claims, 2 Drawing Sheets

US 6,763,171 B2

OPTICAL ASSEMBLY

BACKGROUND OF THE INVENTION

This invention relates to an optical assembly, and is concerned with the mounting of terminations of optical fibres in a manner which permits their visual inspection. Optical fibres are used for the transmission of data and telecommunications and the like, and a large number of individual optical fibres are required to be terminated in equipment associated with a switch or other node at which the optical information is to be processed, eg by way of routing to its destination, combining with other information in a multiplex fashion or by switching information from one optical carrier wavelength to another.

The optical connections are housed within an enclosure, and in practice many such optical connections may need to be housed within a common enclosure. In the event of a fault in the optical system, or for regular maintenance, it is highly desirable to locate the optical connections in a manner which facilitates their inspection and checking. This is difficult if the optical connections are mounted within an equipment enclosure, such as a large cabinet or rack.

The present invention seeks to provide an improved optical assembly.

SUMMARY OF THE INVENTION

According to this invention an optical assembly includes a plurality of optical connectors mounted in a fixed physical relationship with each other; a housing within which the connectors are normally housed and from which they can be withdrawn to permit inspection; a plurality of optical fibres each terminating at a respective one of the optical connectors; and a plurality of movable guides which determine a plurality of optical paths, each of the same path length, for the optical fibres, the guides being of fixed spacing and orientation relative to each other and being movable both with respect to said connectors and said housing so as to maintain said path length substantially constant as the connectors are withdrawn from said housing.

Preferably the plurality of movable guides are movable along a curved line as the connectors are withdrawn from said housing, the line being curved so as to maintain said path length substantially constant.

Preferably again the line is curved so as to approximate an arc of a parabola. Over a sufficiently short arc of a parabola having a shallow curvature, the arc approximates to that of a circle. In practice, an arc of constant radius is satisfactory provided that the length of the arc is short in relation to the radius.

The invention is further described by way of example with reference to the accompanying drawings, in which:

DETAILED DESCRIPTION OF THE PREFERRED EMBODIMENT

Figure 1:
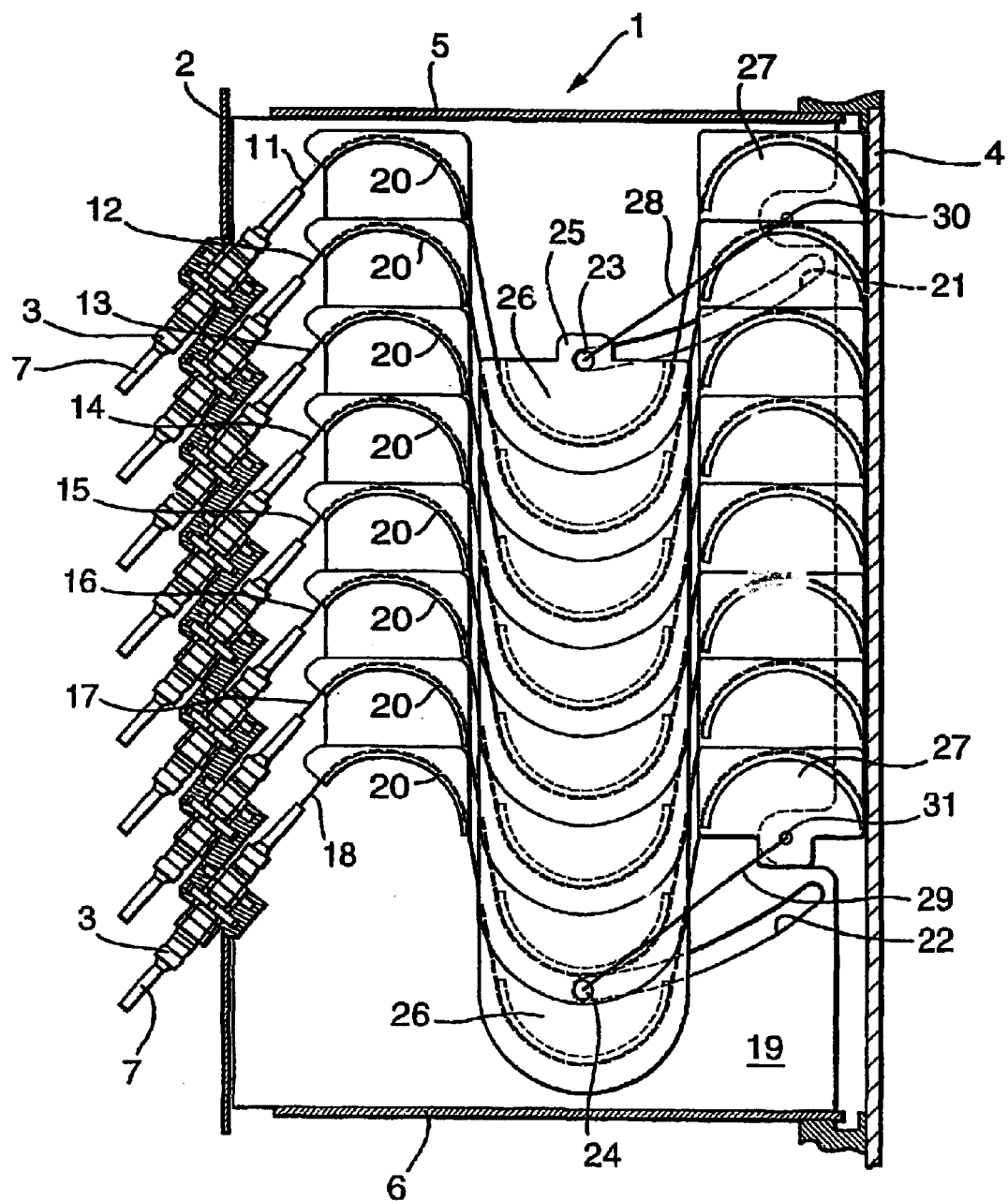
FIG. 1 illustrates an optical assembly in accordance with the invention, in which optical connectors are located within a housing.

Referring to FIG. 1, there is shown therein an optical assembly forming part of communications equipment and consisting of a housing 1, having a front surface 2 carrying eight optical connectors 3, a back surface which defines an optical back plane 4, two end faces 5, 6, and top and bottom surfaces (not shown). If the assembly forms part of a larger equipment, some of these surfaces can be omitted.

Information such as data or telephony is carried to or from each connector 3 via optical fibres 7. Each fibre 7 will link to other communications equipment, and in practice, these fibres 7 may be many kilometres in length. The fibres 7 terminate at the connectors 3 which are mounted in readily accessible positions at the front of the housing. The optical back plane 4 includes electro-optical components or optical-optical components which permit optical signals to be processed by way of switching, multiplexing or the like, and fibres 11–18 are provided linking each of the connectors 3 to the optical back plane 4. Although each fibre 11–18 may be a short length of fibre optically coupled to the optical back plane 4 by means of additional optical connectors (not shown), typically the ends of the fibres 11–18 remote from the connectors 3 form an integral part of the optical back plane 4 where they are routed as necessary and terminated at the appropriate optical component. Because fibres 11–18 form an integral attachment with the optical back plane, replacement of a fibre would be an expensive and difficult process.

A plate 19 is fixed to the front surface 2, and it supports a first set of eight curved guides 20 which are fixed to the plate 19. The plate 19 is provided with two curved slots 21, 22 in which are mounted respective pegs 23 and 24 which are attached to a further plate 25 which carries a second set of eight further curved guides 26. The pegs 23 and 24 are slidable along respective slots 21, 22.

A third set of curved guides 27 is mounted in a fixed relationship with the housing 1, and hence the back plane 4. A pair of rigid arms 28, 29 link the pegs 23, 24 to pivotally mounted attachment points 30, 31 on the housing 1.

The three sets of curved guides define optical paths for each of the fibres 11–18 from the connectors 3 on the front surface 2 to the optical back plane 4.

Figure 2:
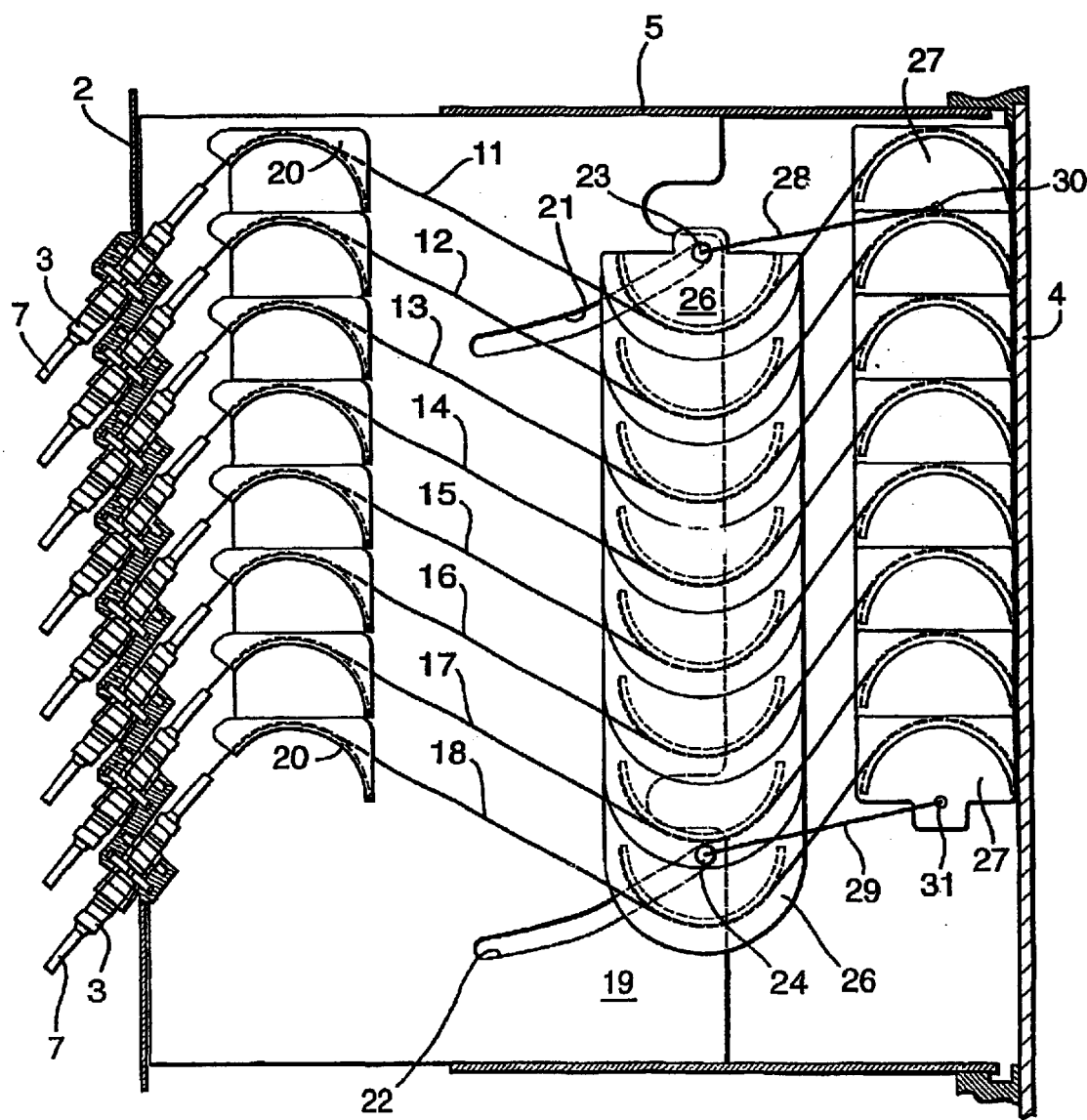
FIG. 2 illustrates the optical assembly in which the optical connectors are shown in their withdrawn position.

To permit visual inspection of each optical connector 3, the front surface 2 on which they are mounted can be withdrawn from the housing 1. The plate 19 which is attached to the front surface 2 is slidably mounted in the housing, so that the plate 19 can be partially withdrawn, as shown in FIG. 2. The connectors 3 are now clear of the housing 1, and so can easily be checked and inspected for faults.

Clearly, the guides 20 which are mounted on the plate 19 move with the front surface 2 and the connectors 3 when they are withdrawn from the housing.

From FIG. 2, it can be seen that as the connectors 3 are withdrawn from the housing 1, the pegs 23 and 24 are constrained by the pivotally mounted arms 28, 29 to slide along the slots 21, 22 and to thereby move the second set of guides 26, so as to alter the paths of the optical fibres 11–18.

The slots 21, 22 are so curved as to ensure that the path lengths of the optical fibres remain substantially constant as the connectors 3, and the plate 19 are withdrawn from the housing 2.

The slots 21, 22 take the form of a short arc of a parabolic curve, but as the slots are short they approximate to an arc of a circle of large radius.

It will be understood that the second set of guides 26 move relative to both the first and third sets of guides, the position of the second set being determined by the slots 21, 22 and by the arms 28, 29. By selecting the lengths of the arms 28 and 29 in relation to the shape of the slots 21 and 22, the fibre paths of substantially constant length can be achieved. This is important as the optical fibres are fragile and easily damaged, but are expensive to replace.

What is claimed is:

1. An optical assembly, comprising;
   a) a plurality of optical connectors mounted in a fixed physical relationship with each other;
   b) a housing within which the connectors are normally housed and from which the connectors are withdrawn to permit inspection;
   c) a plurality of optical fibers each terminating at a respective one of the connectors; and
   d) a plurality of movable guides for determining a plurality of optical paths, each path having the same path length for the optical fibers, the guides being of fixed spacing and orientation relative to each other, and the guides being movable both with respect to the connectors and to the housing so as to maintain said path length substantially constant as the connectors are withdrawn from the housing.

2. The optical assembly as claimed in claim 1, wherein the plurality of movable guides is movable along a curved line as the connectors are withdrawn from the housing, the curved line serving to maintain said path length substantially constant.

3. The optical assembly as claimed in claim 2, wherein the curved line is a parabolic arc.

4. The optical assembly as claimed in claim 2, wherein the curved line is a circular arc.

5. The optical assembly as claimed in claim 2, wherein the plurality of guides is mounted on a common plate which is attached to the housing by a plurality of pivotally mounted arms.

6. The optical assembly as claimed in claim 5, wherein the plurality of optical connectors is mounted in fixed relationship with the common plate, wherein the plate has two slots, each slot defining the curved line, and wherein the arms have ends attached to the plate and slidable along the slots.

7. The optical assembly as claimed in claim 6, wherein a first set of the guides is mounted adjacent to the connectors in a fixed position therewith so as to define a part of the optical paths.

8. The optical assembly as claimed in claim 7, wherein the plurality of movable guides constitutes a second set of guides positioned between the first set and a third set of guides which is mounted in a fixed position relative to the housing, and wherein the first, second and third sets define said optical paths.

\* \* \* \* \*